United States Patent
Takada

(10) Patent No.: US 8,251,742 B2
(45) Date of Patent: Aug. 28, 2012

(54) CHARGING CONNECTOR

(75) Inventor: Akinori Takada, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/042,724

(22) Filed: Mar. 8, 2011

(65) Prior Publication Data

US 2011/0230094 A1 Sep. 22, 2011

(30) Foreign Application Priority Data

Mar. 18, 2010 (JP) .................................. 2010-062798

(51) Int. Cl.
*H01R 13/40* (2006.01)
*H01R 13/52* (2006.01)
(52) U.S. Cl. ....................................... 439/589; 439/271
(58) Field of Classification Search .................. 439/271, 439/272, 587, 589
See application file for complete search history.

(56) References Cited

U.S. PATENT DOCUMENTS

| | | | | |
|---|---|---|---|---|
| 4,668,043 A * | 5/1987 | Saba et al. | ..................... | 439/585 |
| 4,698,027 A * | 10/1987 | Vandame | ....................... | 439/271 |
| 4,776,813 A * | 10/1988 | Wilson et al. | ................... | 439/587 |
| 5,751,135 A * | 5/1998 | Fukushima et al. | ........... | 320/107 |
| 5,921,803 A | 7/1999 | Mori | | |
| 6,323,743 B1 * | 11/2001 | Zelenz et al. | .................. | 333/185 |
| 6,402,538 B2 * | 6/2002 | Suzuki | ........................... | 439/271 |
| 6,674,343 B2 * | 1/2004 | Gould et al. | ................... | 333/185 |
| 6,910,905 B2 * | 6/2005 | Tanaka et al. | .................. | 439/271 |

FOREIGN PATENT DOCUMENTS

| | | |
|---|---|---|
| EP | 1164662 | 12/2001 |
| GB | 2374738 | 10/2002 |
| WO | 9007204 | 6/1990 |
| WO | 9628864 | 9/1996 |

* cited by examiner

*Primary Examiner* — Briggitte R Hammond
(74) *Attorney, Agent, or Firm* — Gerald E. Hespos; Michael J. Porco

(57) ABSTRACT

A charging connector (10) is provided for connection to a vehicle-side connector (50) in a vehicle. The charging connector (10) has terminal fittings (20) to be electrically conductively connected to vehicle-side terminals (60) in the vehicle-side connector (50), and terminal accommodating portions (15) internally formed with cavities (17) for accommodating the terminal fittings (20). A front wall of each cavity (17) includes a resilient member (30) that allows the insertion of the vehicle-side terminal (60) into the cavity (17) while being held in close contact with the vehicle-side terminal (60) over the entire circumference.

16 Claims, 4 Drawing Sheets

CHARGING CONNECTOR

BACKGROUND OF THE INVENTION

1. Field of the Invention

The invention relates to a charging connector connectable to a vehicle-side connector in a vehicle.

2. Description of the Related Art

U.S. Pat. No. 5,921,803 discloses a charging with a terminal accommodating portion integrally formed with a cavity for accommodating a terminal fitting. The terminal fitting includes a cylindrical fitting for receiving a pin-shaped vehicle-side terminal of a vehicle-side connector. A circumferential groove is formed in the inner circumferential surface of the fitting and an O-ring is mounted in the circumferential groove. The O-ring closely contacts the vehicle-side terminal over the entire circumference to wipe off foreign matter, such as muddy water deposits, on a surface of the vehicle-side terminal and prevents the foreign matter from entering the fitting.

The charging connector is used outdoors. Thus, a muddy water test is conducted in which the charging connector is immersed in muddy water, dried and then repeatedly connected to and separated from a vehicle-side connector. The charging connector is required to have durability for the muddy water test.

The above-described charging connector can prevent foreign matter from entering the fitting, but cannot prevent foreign matter from entering between the fitting and the terminal accommodating portion, i.e. the cavity. Foreign matter is removed by the O-ring in the fitting accommodated in the cavity. However, the foreign matter wiped off by the O-ring remains in the cavity. As a result, a large amount of foreign matter accumulates in the cavity by repeatedly inserting and withdrawing the vehicle-side terminal.

Further, the charging connector may be dropped by mistake and can be damaged by a protruding object present at a falling point. More particularly, a front part of the terminal accommodating portion, i.e. a front wall of the cavity, may be damaged by colliding with the protruding object if the charging connector is dropped.

The invention was developed in view of the above situation and an object thereof is to prevent foreign matter from entering a cavity and prevent a front wall of the cavity from being damaged.

SUMMARY OF THE INVENTION

The invention is directed to a charging connector connectable to a vehicle-side connector provided in a vehicle. The charging connector has a terminal fitting to be connected electrically conductively to a vehicle-side terminal in the vehicle-side connector. A terminal accommodating portion is formed internally with a cavity for accommodating the terminal fitting. A front wall of the cavity includes at least one resilient member that allows the insertion of the vehicle-side terminal into the cavity while being held in close contact with the vehicle-side terminal over substantially the entire circumference.

According to this construction, the resilient member closely contacts the vehicle-side terminal over substantially the entire circumference when the vehicle-side terminal is connected to the terminal fitting. Thus, foreign matter deposited on a surface of the vehicle-side terminal can be removed. Further, the resilient member at the front wall of the cavity absorbs the impact if the charging connector is dropped by mistake and thus prevents damage to the front wall of the in addition to restricting the entry of foreign matter into the cavity.

The front wall of the cavity may be formed integrally or unitarily to the terminal accommodating portion by co-molding or two-color molding. Thus, the front wall can be formed more easily as compared with the case where the front wall is formed as a separate member and is mounted separately on the terminal accommodating portion.

A contact portion is formed on the front wall of the cavity and extends substantially in an inserting direction of the vehicle-side terminal. The contact portion is held in close surface contact with the vehicle-side terminal to restrict entry of foreign matter due to an increased contact area.

The front wall of the cavity may include a cavity inner wall defining an inner wall of the cavity. The resilient member is arranged on the front side of the cavity inner wall and a holder holds the resilient member between the cavity inner wall portion and the holder. The resilient member between the cavity inner wall and the holder restricts detachment of the resilient member due to insertion and withdrawal of the vehicle-side terminal.

The holder may be press-fit onto the cavity inner wall. The press-fitting of the holder onto the cavity inner wall simplifies the construction of holder.

The holding member may be mounted threadedly on the cavity inner wall. The threaded mounting can firmly mount the holder on the cavity inner wall.

The resilient member may comprise at least one guide surface for guiding the vehicle-side terminal by substantially sliding the leading end thereof along the guide surface.

The resilient member may comprise a contact surface for contacting a portion of a vehicle-side cavity of the vehicle-side connector.

The resilient member may comprise at least one guide surface to slide in contact with a vehicle-side cavity of the vehicle-side connector. Thus, the terminal accommodating portion may be guided into the vehicle-side cavity.

The terminal fitting may comprise a contact piece with a substantially mountain shape whose peak is near the axial center of a main portion and near a leading end of the main portion.

The resilient member preferably comprises an insertion hole, though which the vehicle-side terminal is to be inserted. The insertion hole preferably penetrates through a central part of the resilient member. At least one sealing projection may project radially inwardly at the insertion hole for closely contacting the outer circumferential surface of the vehicle-side terminal over the entire circumference.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
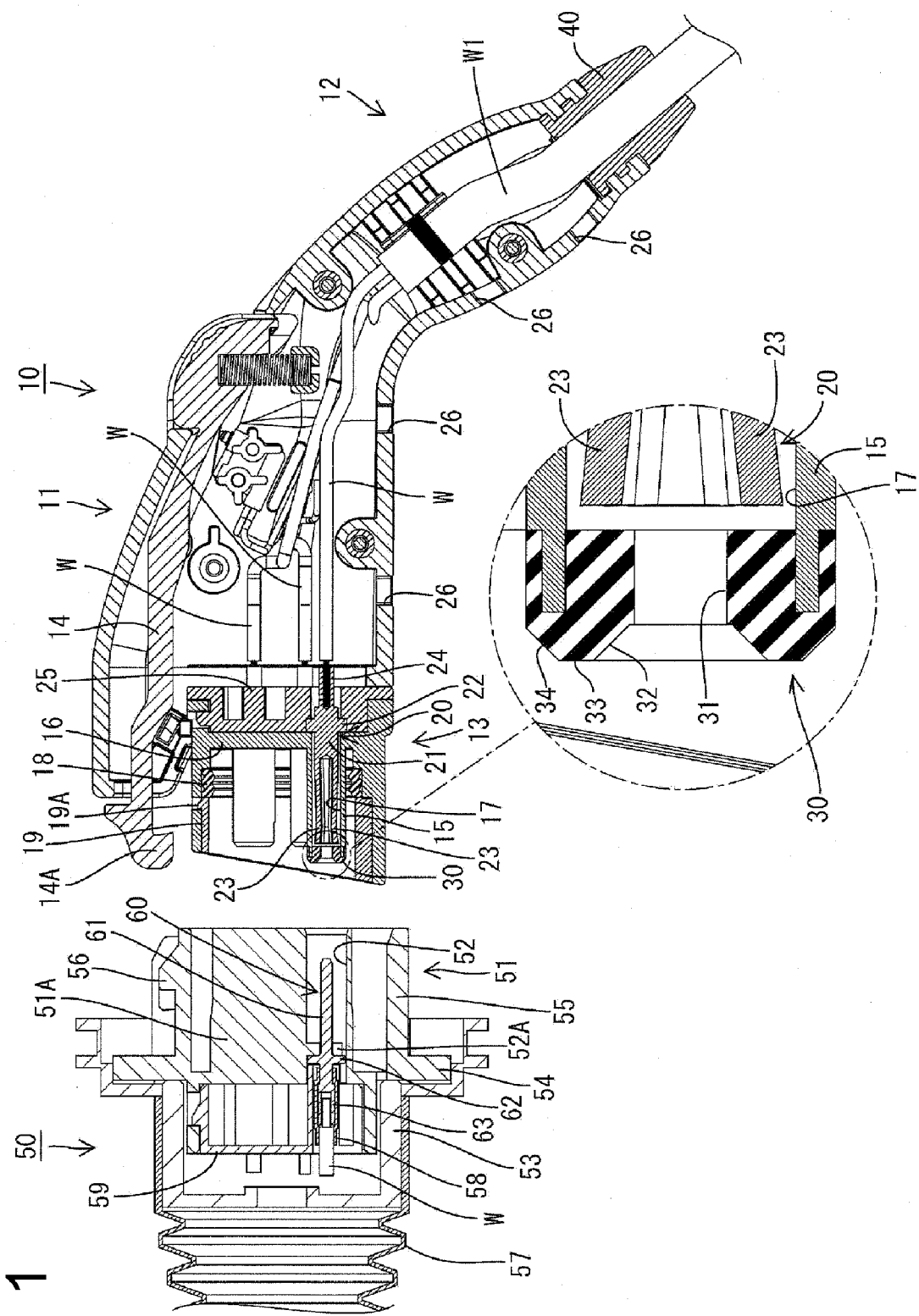
FIG. 1 is a section showing a state before a vehicle-side connector and a charging connector are connected with a resilient member and its surroundings enlarged.

A first embodiment of the invention is described with reference to FIGS. 1 and 2. A charging connector 10 of this embodiment is connectable with a vehicle-side connector 50. In the following description a connection direction of the charging connector 10 with the vehicle-side connector 50 is referred to as a front end or a forward direction. The charging connector 10 is substantially gun-shaped and has a main body 11 constituting a front portion and a grip 12 extending obliquely down from a rear portion of the main body 11, as shown in FIG. 1. The main body 11 and the grip 12 both are molded unitarily of a substantially rigid synthetic resin. A substantially cylindrical receptacle 13 projects forward on the front of the main body 11. A lever 14 is accommodated at an upper side of the interior of the main body 11, and a front end thereof is exposed from the front of the upper surface of the connector main body 11.

The receptacle 13 is formed as a separate member from the main body 11, and fixed to the main body 11 by locking means, as shown in FIG. 1. Cylindrical terminal accommodating portions 15 project forward from a back wall 16 of the receptacle 13 and are not exposed to the outside from the opening edge of the receptacle 13. Thus, the terminal accommodating portions 15 do not directly hit the ground even if the charging connector 10 is dropped by mistake. Accordingly, the receptacle 13 protects the terminal accommodating portions 15.

Cavities 17 are formed in the terminal accommodating portions 15 for accommodating terminal fittings 20. The cavities 17 are open at the rear surface of the back wall 16 of the receptacle 13.

A cylindrical rubber ring 18 is mounted along the inner circumferential surface of the receptacle 13 and a holder 19 is mounted before the rubber ring 18 for retaining the rubber ring 18. The holder 19 has the same substantially cylindrical shape as the rubber ring 18 and includes at least one lock 19A engageable with an inner side of the receptacle 13. The lock 19A holds the holder 19 along the inner circumferential surface of the receptacle 13.

A mounting portion for the holder 19 on the inner circumferential surface of the receptacle 13 has a larger diameter than the back side of the holder 19. The inner circumferential surface of the holder 19 and the inner circumferential surface of the receptacle 13 behind the rubber ring 18 are substantially aligned and flush when the holder 19 is mounted. Lips of the rubber ring 18 project radially inwardly of the inner circumferential surface of the holder 19. On the other hand, the vehicle-side connector 50 includes a vehicle-side housing 51 connectable to the charging connector 10. The vehicle-side housing 51 is made of synthetic resin and includes a main body 51A that can fit into the receptacle 13, as shown in FIG. 2. Thus, the outer circumferential surface of main body 51A closely contacts the lips of the rubber ring 18 when the main body 51A is fit into the receptacle 13 to providing waterproofing or sealing between the connectors 10 and 50.

Vehicle-side cavities 52 are formed in the housing main body 51A for accommodating corresponding vehicle-side terminals 60. The vehicle-side housing 51 is mounted in a mounting opening 53 in a vehicle body. A mounting plate 54 projects from the outer periphery of the vehicle-side housing 51, and the vehicle-side housing 51 is fixed to the mounting opening 53 by placing the mounting plate 54 substantially along the opening edge of the mounting opening 53 and fixing it by, for example bolting.

A fitting tube 55 is provided circumferentially around the outer circumferential surface of the housing main body 51A. The fitting tube 55 projects substantially forward from the mounting plate 54, so that the receptacle 13 is fit between the housing main body 51A and the fitting tube 55. A lock projection 56 is provided on the upper surface of the fitting tube 55. This lock projection 56 is engageable in a connecting direction with a lever-side projection 14A projecting from the lower surface of the leading end of the lever 14. Accordingly, the lever-side projection 14A engages the lock projection 56 when the two connectors 10, 50 are connected to hold the two connectors 10, 50 in a connected state. Note that a bellows-like grommet 57 is mounted on a rear part of the mounting opening portion 53 ands extends rearward.

Each vehicle-side terminal 60 has a pin-shaped male-side main portion 61, and a male-side flange portion 62 is provided circumferentially to project from the outer circumferential surface of the male-side main portion 61. The male-side flange 62 contacts a rear wall 52A of the vehicle-side cavity 52 from behind, and the male-side main portion 61 extends through the rear wall 52A and into the vehicle-side cavity 52. The terminal accommodating portions 15 of the charging connector 10 can be accommodated into the vehicle-side cavities 52.

A tubular male-side barrel 63 is formed at a rear end of the male-side main portion 61. A core of a wire W is placed in the male-side barrel 63 and fixed by crimping, bending, folding or deforming. Further, a heat shrinkable tube 58 is mounted to cover a crimping part of the male-side barrel 63 to protect the crimping part of the male-side barrel portion 63 from water. A vehicle-side retainer 59 is mounted on a rear part of the vehicle-side housing 51 and engages the male-side flanges 62 of the vehicle-side terminals 60 from behind to prevent the vehicle-side terminals 60 from coming out backward.

The terminal fitting 20 of the charging connector 10 includes a female-side main portion 21 a plurality of contact pieces 23. The contact pieces 23 particularly are defined by a plurality of slits formed intermittently in a circumferential direction. The slits extend back from the front end opening edge of the terminal main body 21 having an open front end. The terminal of this type is called a slotted terminal in some cases.

Each contact piece 23 of the terminal fitting 20 moderately approaches an axial center from a base end portion toward a leading end portion and then moves away from the axial center at the leading end portion in a natural state before connection with the vehicle-side terminal 60. Thus, the contact piece 23 has a substantially mountain shape whose peak is near the axial center of the female-side main portion 21, and the position of the peak is arranged at a leading end portion of the female-side main portion 21. That is, a contact portion of the terminal fitting 20 is formed by the peaks of the contact pieces 23, and an inner diameter in this contact portion is smaller than an outer diameter of the male-side main portion 61 of the vehicle-side terminal 60. Thus, when the vehicle-side terminal 60 is fit into the terminal fitting 20, the male-side main portion 61 of the vehicle-side terminal 60 and the respective contact pieces 23 substantially slide at the contact portion and the vehicle-side terminal 60 and the terminal fitting 20 are connected electrically conductively with the respective contact pieces 23 resiliently deformed radially out.

A female-side flange portion 22 is provided circumferentially on a rear side of the outer circumferential surface of the female-side main portion 21. This female-side flange 22 can contact the rear end opening edge of the cavity 17 to prevent the terminal fitting 20 from moving any further forward. On the other hand, a back retainer 25 is mounted in a rear part of the receptacle 13 and engages the female-side flanges 22 of the terminal fittings 20 from behind for preventing the terminal fittings 20 from being withdrawn backward. Thus, longitudinal forward and backward movements of the terminal fittings 20 are prevented since the female-side flanges 22 are held between the rear end opening edges of the cavities 17 and the back retainer 25.

A wire connection barrel 24 is formed behind the female-side main portion 21 and is fixed to the core exposed at an end of the wire W. The barrel 24 projects back through an insertion hole that penetrates through the back retainer 25. The barrel 24 is a rearwardly open cylinder and is crimped, bent, folded or deformed into electrically conductive connection with the wire W accommodated inside. The wire W extends back from the barrel 24 and is drawn out to the outside through the interiors of the connector main body 11 and/or the grip 12.

Wires W extend back in the main body 11 in correspondence with the terminal fittings 20. The wires W are bundled and covered by an outer sheath in the grip 12 to define one cable W1. The cable W1 is fixed by a cable grip ring (not shown) or the like in the grip 12 and is fixed further by a bush 40 at a rear end portion of the grip 12. The bush 40 closely contacts the inner circumferential surface of the rear end opening of the grip 12 and the outer circumferential surface of the cable W1 to prevent water from entering the interior through the rear end of the grip 12. Water drain holes 26 are formed in the lower surfaces of the connector main body 11 and the grip 12 so that any water that enters the interiors of the connector main body 11 and the grip 12 can escape to the outside.

Figure 2:
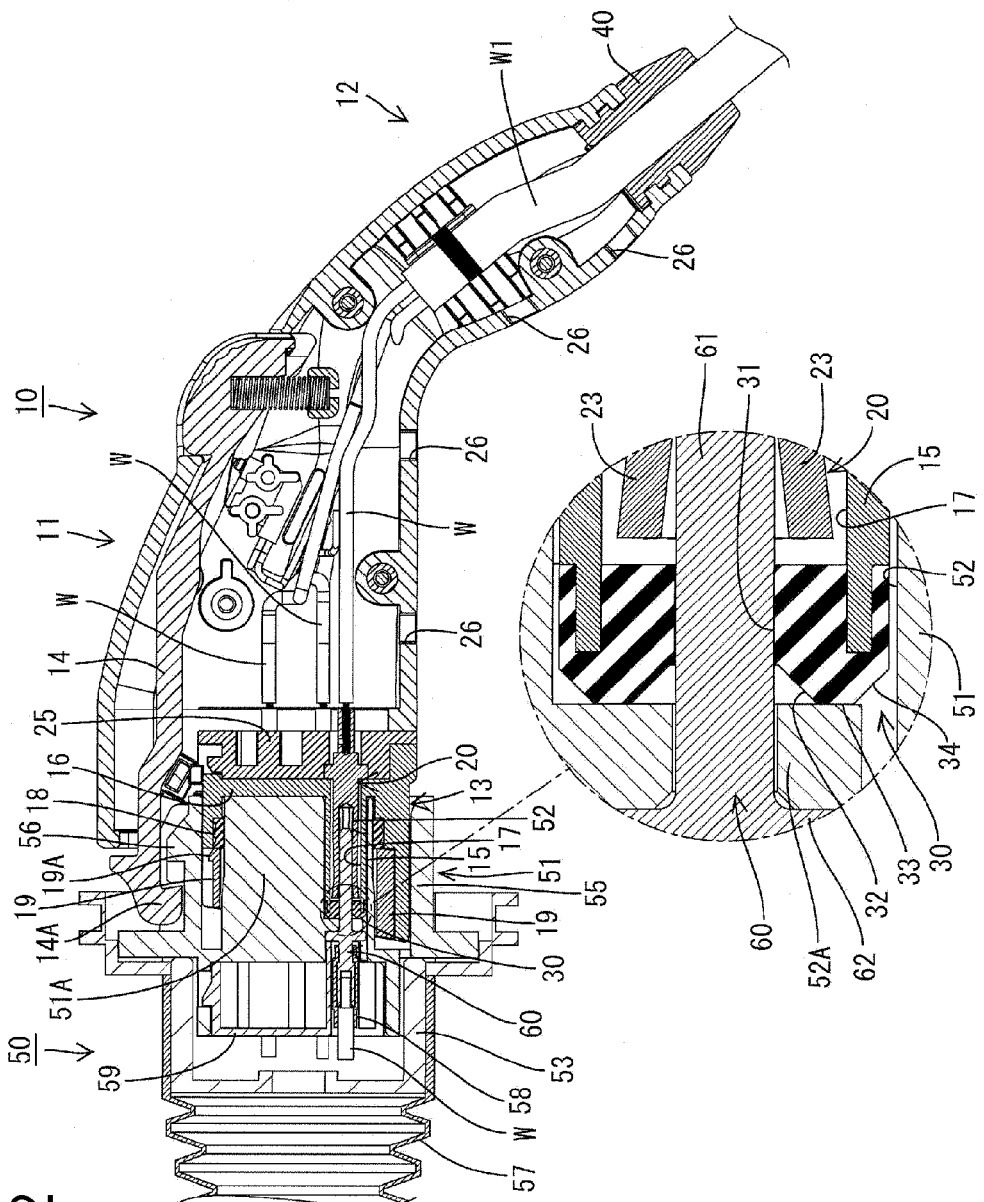
FIG. 2 is a section showing the vehicle-side connector and the charging connector connected with the resilient member and its surroundings enlarged.

A front wall of each cavity 17 comprises a resilient member 30 as shown in enlarged sections of FIGS. 1 and 2. The resilient member 30 is formed integrally to the terminal accommodating portion 15 by co-molding or two-color molding. Thus, the resilient member 30 constitutes a part of the terminal accommodating portion 15. An insertion hole 31 penetrates through a central part of the resilient member 30 and receives the male-side main portion 61 of the vehicle-side terminal 60. An inner circumferential surface of the insertion hole 31 extends in an inserting direction of the male-side main portion 61 and is held entirely in close surface contact with the outer circumferential surface of the male-side main portion 61.

A front end opening of the insertion hole 31 is formed into a conical or converging guide surface 32. Thus, the male-side main portion 61 can be guided into the insertion hole 31 by sliding the leading end thereof along the guide surface 32 even if an axial centers of the male-side main portion 61 and the insertion hole 31 are displaced due to a molding error of the resilient member 30 or another reason.

A contact surface 33 is formed at a side of the resilient member 30 radially outward of the guide surface 32 and contacts the rear wall 52A of the vehicle-side cavity 52 from the front. Further, the contact of the contact surface 33 with the rear wall 52A of the vehicle-side cavity 52 suppresses shaking of the two connectors 10, 50 in the connected state and absorbs an impact produced when the two connectors 10, 50 are connected. Note that the front end of the female-side main portion 21 and the resilient member 30 are arranged to substantially face each other while being spaced apart by a specified distance with the terminal fitting 20 accommodated in the cavity 17.

A side of the resilient member 30 radially outward of the contact surface 33 has a corner cut off to define a frustoconical or rounded guide surface 34. This guide surface 34 guides the terminal accommodating portion 15 when the terminal accommodating portion 15 is inserted into the vehicle-side cavity 52. In other words, the at least one guide surface 34 slides in contact with the front end opening edge of the vehicle-side cavity 52 to guide the terminal accommodating portion 15 into the vehicle-side cavity 52.

According to this construction, as the two connectors 10, 50 are connected, the male-side main portions 61 enter the insertion holes 31 of the resilient member 30. At this time, the outer circumferential surfaces of the male-side main portions 61 slide in contact with the inner circumferential surfaces of the insertion holes 31. Thus, foreign matter, such as muddy water deposited on surfaces of the male-side main portions 61, is removed and will not enter the cavities 17. The foreign matter removed by the resilient members 30 temporarily accumulates between the guide surfaces 32 and the rear walls 52A of the vehicle-side cavities 52. However, as the two connectors 10, 50 are separated, the guide surfaces 32 and the rear walls 52A of the vehicle-side cavities 52 are separated and the foreign matter falls down and is discharged to the outside of the connectors 10, 50.

Even if the charging connector 10 is dropped by mistake and a protruding object collides with the resilient member 30, an impact can be absorbed by the resilient member 30. Therefore damage of the terminal accommodating portion 15 is avoided. Further, the resilient member 30 and the terminal accommodating portion 15 are formed integrally by co-molding or two-color molding. Thus, the front wall of the cavity 17 is formed more easily as compared with the case where the resilient member 30 is a separate member mounted on the terminal accommodating portion 15.

Figure 3:
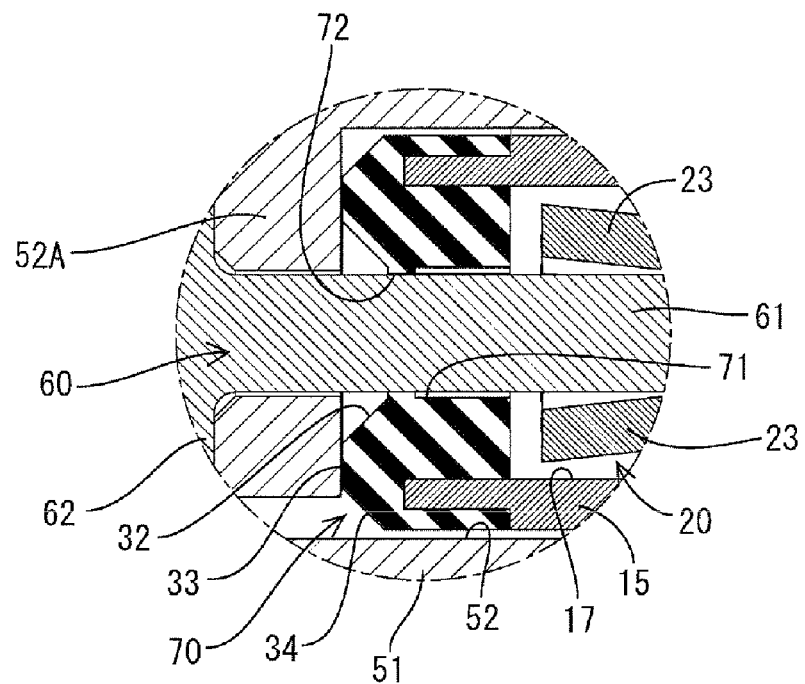
FIG. 3 is a partial enlarged section showing a resilient member and its surroundings in a second embodiment.

A second embodiment of the invention is described with reference to FIG. 3. The second embodiment is obtained by partly changing the construction of the front wall of the cavity 17 of the first embodiment. Other constructions, functions and effects are the same or similar and are not described again. Further, the identical or similar constructions as in the first embodiment are identified by the same reference numerals. A front wall of a cavity 17 in this embodiment comprises a resilient member 70 as shown in FIG. 3. The resilient member 70 is formed integrally with a terminal accommodating portion 15 by co-molding or two-color molding as in the first embodiment and constitutes a part of the terminal accommodating portion 15.

An insertion hole 71 penetrates a central part of the resilient member 70 and can receive a male-side main portion 61 of a vehicle-side terminal 60. At least one substantially ring-shaped sealing projection 72 is formed to project radially inwardly at the front end of the inner circumferential surface of the insertion hole 71 and is held in close contact with the outer circumferential surface of the male-side main portion 61 over the entire circumference. This ring-shaped sealing projection 72 is held in close contact with the outer circumferential surface of the male-side main portion 61.

In this embodiment, the inner circumferential surface of the insertion hole 31 is not in surface contact with the male-side main portion 61 as in the first embodiment and the sealing projection 72 is in substantially line contact with the male-side main portion 61 at a part of the inner circumferential surface of the insertion hole 71. Thus, a frictional force resulting from sliding contact of the male-side main portion 61 and the sealing projection 72 decreases and insertion resistance at the time of inserting the male-side main portion 61 into the insertion hole 71 decreases.

Figure 4:
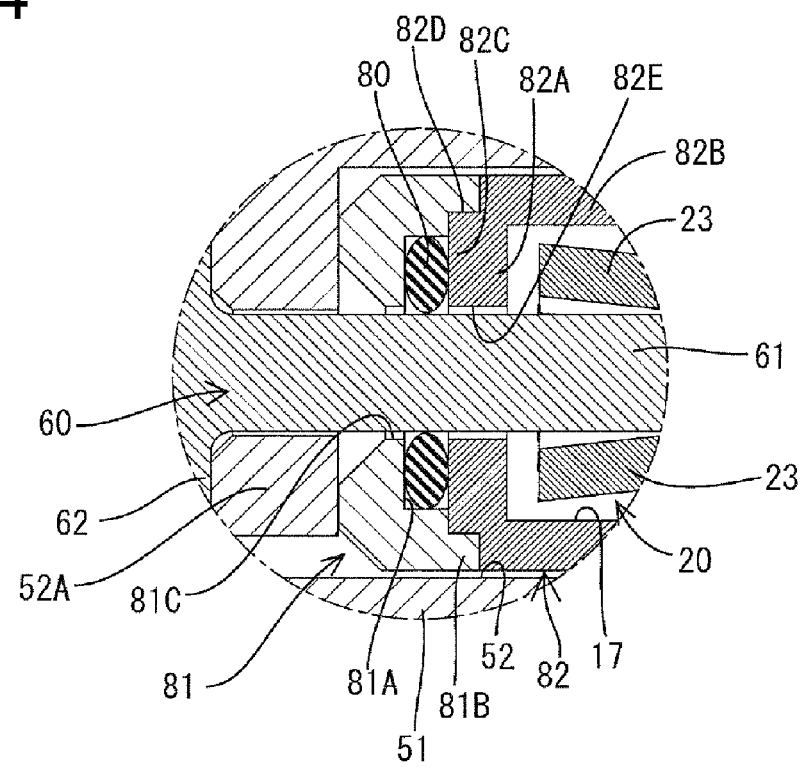
FIG. 4 is a partial enlarged section showing a seal ring and its surroundings in a third embodiment.

A third embodiment of the invention is described with reference to FIG. 4. The third embodiment is obtained by partly changing the construction of the front wall of the cavity 17 in the first embodiment and, accordingly, the construction of the terminal accommodating portion 15 also is changed partly. The other constructions, functions and effects are the same or similar and are not described. Further, the same or similar constructions as in the first embodiment are identified by the same reference numerals.

A terminal accommodating portion 82 in this embodiment includes a front wall 82A constituting part of a front wall of an inner wall of a cavity 17 and a side wall 82B constituting part of a side wall of the inner wall of the cavity 17. The front and side walls 82A and 82B are formed unitarily. Further, in this embodiment, a substantially ring-shaped seal ring 80 is sandwiched between the front wall 82A and a holding cap 81 mounted on the front surface of the front wall 82A. In other words, a front wall of the cavity 17 in this embodiment includes the front wall 82A, the seal ring 80 and the holding cap 81.

A base 82C for receiving the seal ring 80 projects from a surface of the front wall 82A facing the holding cap 81. The base 82C has a smaller diameter than the side wall 82B, and a step 82D is formed between the front surface of the base 82C and the outer side surface of the side wall 82B. An insertion hole 82E penetrates a central part of the front wall 82A and receives a male-side main portion 61 of a vehicle-side terminal 60.

The holding cap 81 is made e.g. of synthetic resin and an accommodating recess 81A for accommodating the seal ring 80 is formed in a surface of the holding cap 81 facing the base 82C. An outer peripheral flange 81B is provided circumferentially on a surface of the holding cap 81 facing the step 82D and is press-fit into the step 82D. Further, an insertion hole 81C penetrates through a central part of the holding cap 81 for receiving the male-side main portion 61. The seal ring 80 is sandwiched between the accommodating recess 81A and the base 82C when the outer peripheral flange 81B is press-fit into the step 82D. Thus, the seal ring 80 is deformed resiliently radially by being compressed from front and back sides and the inner circumferential surface of the seal ring 80 comes to have a smaller diameter to be held in close contact with the outer circumferential surface of the male-side main portion 61.

The holding cap 81 of this embodiment is simplified since the holding cap 81 by being press-fit. Further, the seal ring 80 is not detached by insertion and withdrawal of the male-side main portion 61 since the seal ring 80 is sandwiched between the accommodating recess 81A and the base portion 82C. Furthermore, even if a charging connector is dropped by mistake and the terminal accommodating portion 82 collides with a protruding object, an impact at the time of a fall can be absorbed by the seal ring 80 constituting the front wall of the cavity 17 and damage of the terminal accommodating portion 82 can be prevented.

For example, depending on a combination of the materials of the seal ring 80 and the terminal accommodating portion 82, adhesion of these materials may be difficult at the time of molding and it may not be possible to perform two-color molding. In this embodiment, even in such a case, the front wall of the cavity 17 including a resilient member can be formed regardless of a combination of materials since the seal ring 80 is physically sandwiched using the holding cap 81.

Figure 5:
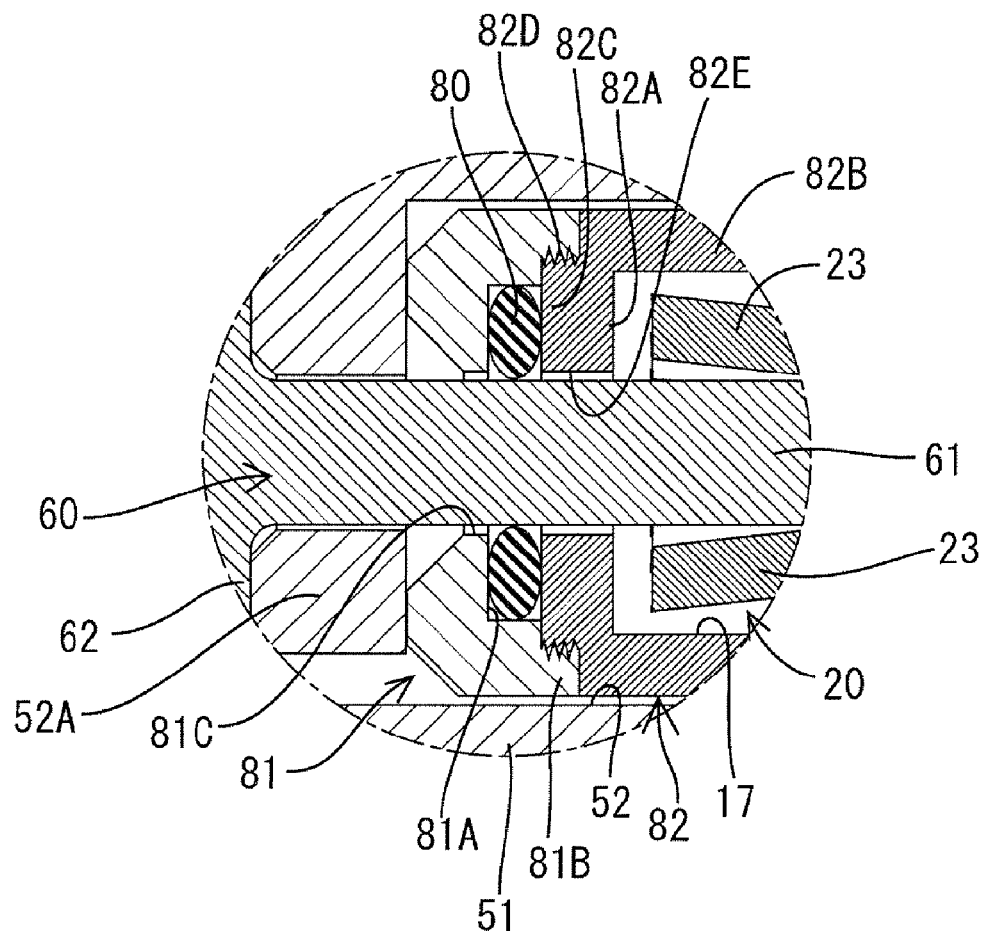
FIG. 5 is a partial enlarged section showing a seal ring and its surroundings in a fourth embodiment.

A fourth embodiment of the invention is described with reference to FIG. 5. The fourth embodiment is obtained by partly changing a method for fixing the holding cap 81 and the front wall portion 82A in the third embodiment. Other constructions, functions and effects are not described because they are the same or similar to those described above. Rather, the similar or substantially same constructions as in the third embodiment are identified by the same reference numerals.

An internal thread is formed in the inner circumferential surface of an outer peripheral flange 81B, an external thread is formed on the outer circumferential surface of a base 82C, and a holding cap 81 is threadedly mounted on a front wall 82A by fitting the base 82C into the inner side of the outer peripheral flange 81B and tightening the holding cap 81. Therefore, the holding cap 81 can be mounted firmly on the front wall 82A.

The invention is not limited to the above described and illustrated embodiments. For example, the following embodiments also are included in the scope of the invention.

Although the insertion hole is formed in the resilient member in the above embodiments, the vehicle-side terminal may be pierced through the resilient member (e.g. formed of a gelatinous or elastic material) without forming any insertion hole according to the invention. The gelatinous or elastic material may be a gel or elastic or rubbery material containing three dimensional cross-linked molecular formations or behave as if it contained such molecular formations (geloids). One example of a gel that can be used is silicone gel or resin. Another suitable gel comprises a block copolymer having relatively hard blocks (e.g. hydrogenated rubber blocks) examples of such copolymers including styrene-diene block copolymers (linear or radial) for example styrene-butadiene or styrene-isoprene diblock or triblock copolymers, or styrene-ethylene-butylene-styrenes triblock copolymers. The gel may be formed from a single liquid material that becomes a gel when subjected e.g. to radiation or chemicals; the gel may be formed from two components that become a gel when mixed; or the gel may be a composition which is a gel at working temperature, e.g. room temperature. Additionally or alternatively a gel material as disclosed in U.S. Pat. No. 4,875,870 may be used, which is included herein by reference.

Although the resilient member 30 is integrally formed to the terminal accommodating portion 15 by two-color molding in the first and second embodiments, it may be fixed to the terminal accommodating portion 15 by an adhesive.

Although the holding cap is fixed by press-fitting and threaded engagement in the third and fourth embodiments, it may be fixed using a locking structure with a claw engagement according to the present invention.

Although the seal ring 80 is deformed resiliently by being sandwiched between the accommodating recess 81A and the base 82C in the third and fourth embodiments, it may be so arranged between the accommodating recess 81A and the base 82C as not to be resiliently deformed according to the invention.

What is claimed is:

1. A charging connector connectable to a vehicle-side connector provided in a vehicle, comprising:
   a terminal fitting to be electrically conductively connected to a vehicle-side terminal provided in the vehicle-side connector; and
   a terminal accommodating portion internally formed with at least one cavity for at least partly accommodating the terminal fitting, a front wall of the cavity including at least one resilient member projecting sufficiently into the cavity to allow at least partial insertion of the vehicle-side terminal into the cavity while being held in close contact with the vehicle-side terminal over substantially an entire circumference for removing foreign matter from the vehicle-side terminal as the charging connector is being connected to the vehicle-side connector.

2. The charging connector of claim 1, wherein the front wall of the cavity is formed integrally to the terminal accommodating portion by co-molding or two-color molding.

3. The charging connector of claim 1, wherein a contact portion with the vehicle-side terminal on the front wall of the cavity extends substantially in an inserting direction of the vehicle-side terminal.

4. The charging connector of claim 1, wherein the resilient member comprises at least one guide surface for guiding the vehicle-side terminal (60) by substantially sliding the leading end thereof along the guide surface (32).

5. The charging connector of claim 1, wherein the resilient member comprises a contact surface for contacting a portion of a vehicle-side cavity of a vehicle-side connector.

6. The charging connector of claim 1, wherein the resilient member comprises at least one guide surface disposed for sliding contact with a vehicle-side cavity of the a vehicle-side connector, the terminal accommodating portion being guided into the vehicle-side cavity.

7. The charging connector of claim 1, wherein the terminal fitting comprises a contact piece being formed to have a substantially mountain shape whose peak is near the axial center of a main portion, and the position of the peak is arranged at a leading end portion of the main portion.

8. The charging connector of claim 1, wherein the resilient member comprises an insertion hole, though which the vehicle-side terminal is to be at least partly inserted, which is formed to penetrate through a central part of the resilient member, wherein at least one sealing projection to be held substantially in close contact with the outer circumferential surface of the vehicle-side terminal over the entire circumference is formed to substantially project radially inwardly at the insertion hole.

9. The charging connector of claim 1, wherein the resilient member is molded to portions of the terminal accommodating portion adjacent and open front end thereof so that the resilient member engages parts of inner and outer peripheral surfaces adjacent the open front end and projects forward beyond the open front end of the terminal accommodating portion for protecting the terminal accommodating portion if the charging connector is dropped.

10. The charging connector of claim 1, wherein the charging connector includes a main body having a front portion and a grip extending obliquely rearward from the front portion, the terminal accommodating portion being disposed in the front portion of the main body.

11. The charging connector of claim 1, wherein the front wall of the cavity includes a cavity inner wall constituting an inner wall of the cavity, the resilient member arranged on the front side of the cavity inner wall and a holding member for holding the resilient member between the cavity inner wall portion and the holding member.

12. The charging connector of claim 11, wherein the holding member is press-fit onto the cavity inner wall portion.

13. The charging connector of claim 11, wherein the holding member is threadedly mounted on the cavity inner wall portion.

14. A charging connector for connection with a vehicle-side connector in a vehicle, comprising:
a substantially tubular terminal accommodating portion having an open front end, the terminal accommodating portion being molded from a substantially rigid synthetic resin and being formed internally with at least one cavity;
a female terminal fitting in the cavity and configured for connection with a male terminal fitting in the vehicle side connector; and
a front member mounted to the front end of the terminal accommodating portion and having an entry leading to the cavity, the front member including at least one resilient member defining at least part of the entry to the cavity, the resilient member projecting sufficiently into the cavity to achieve sliding contact with the male terminal fitting over substantially an entire outer circumference of the male terminal fitting as the charging connector is being connected to the vehicle side connector for removing foreign matter from the outer circumference of the male terminal fitting and preventing the foreign matter from entering the cavity.

15. A charging connector connectable to a vehicle-side connector provided in a vehicle, comprising:
a terminal fitting to be electrically conductively connected to a vehicle-side terminal provided in the vehicle-side connector; and
a terminal accommodating portion internally formed with at least one cavity for at least partly accommodating the terminal fitting, a front wall of the cavity including a cavity inner wall constituting an inner wall of the cavity, at least one resilient member arranged on the cavity inner wall and allowing at least partial insertion of the vehicle-side terminal into the cavity while being held in close contact with the vehicle-side terminal over substantially an entire circumference, and a holding member holding the resilient member between the cavity inner wall and the holding member, the holding member being press-fit onto or threadedly mounted on the cavity inner wall portion.

16. The charging connector of claim 15, wherein the holding member comprises a cap mounted to the front end of the terminal accommodating portion and a resilient member between the cap and the terminal accommodating portion.

* * * * *